United States Patent
Bacchi et al.

(10) Patent No.: US 7,696,739 B2
(45) Date of Patent: Apr. 13, 2010

(54) ELECTRONIC SWITCH CIRCUIT, CONVERTER AND METHOD OF OPERATION

(75) Inventors: Matthew Bacchi, Saveres (FR); Vincent Teil, Ramonville St. Agne (FR)

(73) Assignee: Freescale Semiconductor, Inc., Austin, TX (US)

( * ) Notice: Subject to any disclaimer, the term of this patent is extended or adjusted under 35 U.S.C. 154(b) by 256 days.

(21) Appl. No.: 11/910,371

(22) PCT Filed: Apr. 1, 2005

(86) PCT No.: PCT/EP2005/005034

§ 371 (c)(1),
(2), (4) Date: Oct. 1, 2007

(87) PCT Pub. No.: WO2006/102930

PCT Pub. Date: Oct. 5, 2006

(65) Prior Publication Data

US 2008/0191677 A1  Aug. 14, 2008

(51) Int. Cl.
    *G05F 1/565* (2006.01)
(52) U.S. Cl. .............................. 323/285; 323/283
(58) Field of Classification Search ............ 323/222, 323/283–287; 327/307; 363/21.04, 21.05, 363/21.12, 21.13
See application file for complete search history.

(56) References Cited

U.S. PATENT DOCUMENTS

| 5,880,947 | A  | * | 3/1999  | Imanaka et al. ............. 363/89  |
| 5,969,515 | A  | * | 10/1999 | Oglesbee .................... 323/283 |
| 6,194,884 | B1 | * | 2/2001  | Kesler et al. ............... 323/285 |
| 6,262,619 | B1 | * | 7/2001  | McGreer et al. ............ 327/307 |
| 6,828,762 | B2 | * | 12/2004 | Brkovic ....................... 323/222 |
| 2003/0206022 | A1 |  | 11/2003 | Ying et al. |
| 2009/0190376 | A1 | * | 7/2009 | Morita et al. ................ 363/19 |

FOREIGN PATENT DOCUMENTS

JP     200551858 A     2/2005

* cited by examiner

*Primary Examiner*—Jeffrey L Sterrett
*Assistant Examiner*—Fred E Finch, III

(57) ABSTRACT

An electronic switch circuit includes an electronic switch having a first terminal, a second terminal and a third terminal, control means for applying to the first terminal a cyclic drive waveform which causes the electronic switch to conduct between the second and third terminals during a selected portion of each cycle of the waveform, operably coupled to the control means to control synchronisation of the cyclic drive waveform a detector operable to detect a change of direction of current flow at the second terminal of the electronic switch and means for monitoring and, where required, compensating for offset error of the detector. The electronic switch may beneficially be a synchronous rectifier. The synchronous rectifier may be used in DC-DC power converters to improve efficiency.

17 Claims, 5 Drawing Sheets

"PRIOR ART"

ELECTRONIC SWITCH CIRCUIT, CONVERTER AND METHOD OF OPERATION

FIELD OF THE INVENTION

The present invention relates to an electronic switch circuit, a converter including the circuit and a method of operation of the circuit. In particular, the invention relates to a circuit including an electronic switch in the form of a synchronous rectifier and a DC-DC power converter which employs the circuit.

BACKGROUND OF THE INVENTION

Many portable electronic devices employ one or more batteries to provide a source of electrical power. Where such devices also employ semiconductor components such as a microprocessor or memory chip, it is often desirable for the device to include a DC-DC converter to convert the battery voltage, e.g. typically 6 or 9 volts, to a level, e.g. between 1 volt and 4 volts, suitable for application to the semiconductor components. It is desirable, in order to maximise the useful life (service time) of the batteries between charges, to provide a DC-DC converter which is as efficient as possible.

Similarly, other forms of DC-DC converter provide voltage changes between an input voltage and an output voltage, e.g. a step up in voltage or a change from a voltage in a range of given input voltages to a particular desired output voltage. In these various forms of converter it is always desirable to maintain good efficiency.

DC-DC converters employ electronic switch circuits. In particular, many converters employ a switch known as a synchronous rectifier, which is typically a voltage driven semiconductor device, which serves as a controllable device in place of a rectifier diode. A known control circuit for a synchronous rectifier includes a zero crossing detector to prevent unwanted reverse current flow in the synchronous rectifier.

It has been found that operation of the zero crossing detector in known electronic switches circuits which operate as synchronous rectifier circuits is not ideal. Undesirably, this has a deleterious effect on the converter efficiency.

SUMMARY OF THE INVENTION

According to the present invention in a first aspect there is provided an electronic switch circuit as defined in claim 1 of the accompanying claims. An electronic switch included in the circuit may comprise a synchronous rectifier.

According to the present invention in a second aspect there is provided a Dc to DC power converter as defined in claim 13 of the accompanying claims.

According to the present invention in a third aspect there is provided a method of operation of an electronic switch circuit, the method being as defined in claim 20 of the accompanying claims.

Further features of the invention are defined in the accompanying dependent claims and are disclosed in the embodiments of the invention described herein.

Embodiments of the present invention will now be described by way of example with reference to the accompanying drawings, in which:

DESCRIPTION OF EMBODIMENTS OF THE INVENTION

We have found that the efficiency of an electronic switch employing a zero crossing detector in known circuits, particularly a synchronous rectifier used in DC-DC converters, is not ideal and may be improved using embodiments of the invention. In particular, such a zero crossing detector in known circuits may be subject to positive or negative offset errors around an ideal zero crossing point. Previously, such offset errors have been dealt with by setting the crossing point as precisely as possible during manufacture. Such setting, to a sub-mV precision, is time consuming and costly to achieve and in any event the ideal crossing point may drift with time. The offset errors in known circuits and the way in which such errors are dealt with in embodiments of the invention will be described in more detail in the following description.

Figure 1:
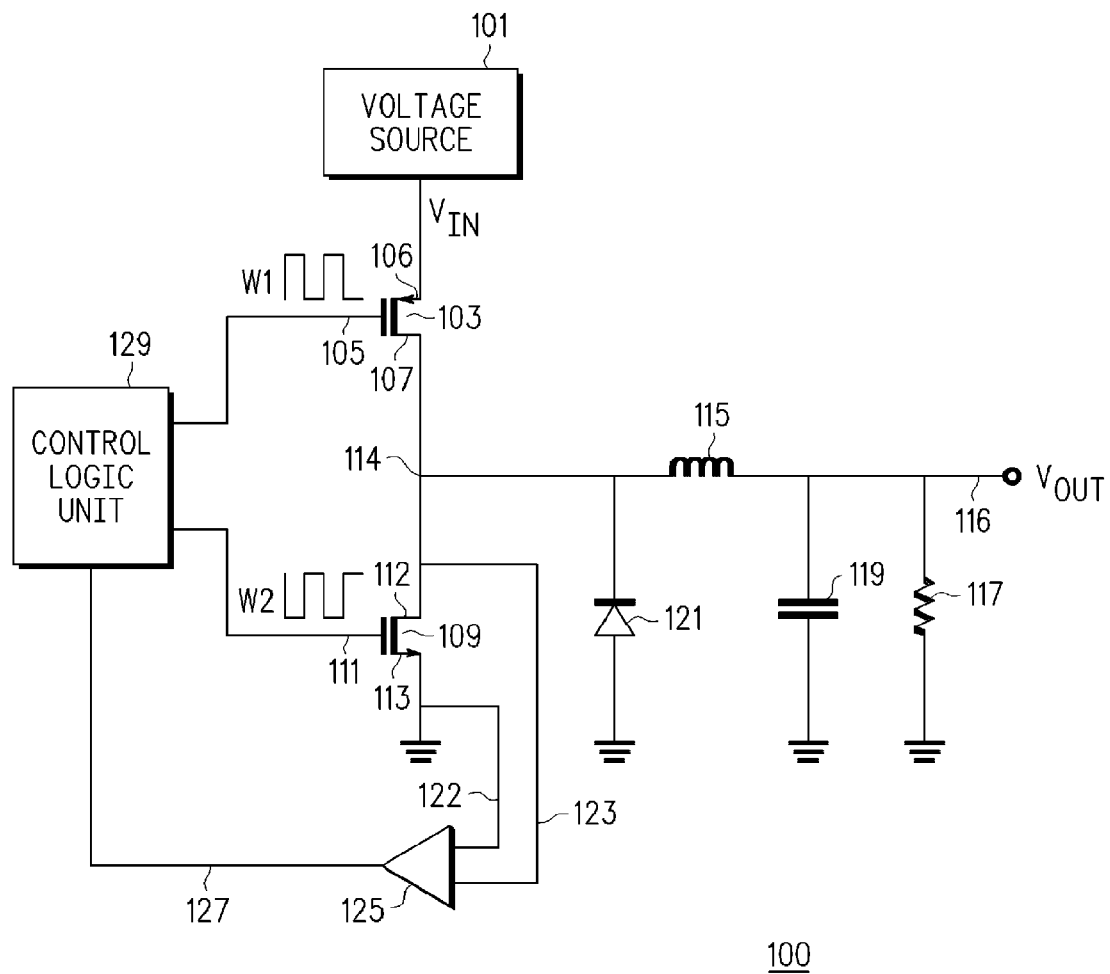
FIG. 1 is a circuit diagram, partly in block schematic form, of a known DC-DC converter.

FIG. 1 is a circuit diagram, partly in block schematic form, of a known DC-DC converter 100 of the Buck converter form incorporating a synchronous rectifier controlled by a zero crossing detector. The converter 100 includes a high side switch 103 a synchronous rectifier 109. The high side switch 103 and the synchronous rectifier 109 are shown in the particular form of p-mos (positive channel metal oxide semiconductor) and n-mos (negative channel metal oxide semiconductor) devices respectively with an applied positive voltage. This is for illustration only. It will be apparent to those skilled in the art that the polarities could be reversed either with reversal of the polarity of the applied voltage or with use of a special gate system, e.g. using a capacitor.

In the converter 100 a voltage source 101 provides an input DC voltage $V_{IN}$ which is applied to a source electrode 106 of the high side switch 103. The high side switch 103 also includes a gate electrode 105 and a drain electrode 107. The high side switch 103 is connected at its drain electrode 107 to a drain electrode 112 of the synchronous rectifier 109. A junction between the drain electrode 107 and the drain electrode 112 is shown as a junction 114. The synchronous rectifier 109 also has a gate electrode 111 and a source electrode 113 which is grounded.

An inductor 115 is connected via the junction 114 to the drain electrode 107 of the high side switch 103 and to the drain electrode 112 of the synchronous rectifier 109. The inductor 115 is connected to a parallel combination of a capacitor 119 and a load resistor 117 both of which are grounded at their other ends (distant from the inductor 115). An output voltage $V_{OUT}$ is developed at an output terminal 116 at a junction connecting the inductor 115, the capacitor 119 and the load resistor 117.

A control logic unit 129 produces an output square wave drive waveform W1 which is applied to the gate electrode 105 of the high side switch 103 and an output square wave drive waveform W2 which is applied to the gate electrode 111 of the synchronous rectifier 109. The waveforms W1 and W2 are such that the waveform W1 drives the electronic switch 103 to be on, i.e. to conduct, whilst the synchronous rectifier 109 is off and the waveform W2 drives the synchronous rectifier to be on, whilst the high side switch 103 is off, although there can be delay between the synchronous rectifier 109 being turned off by the waveform W2 and the high side switch 103 being turned on by the waveform W1. The waveforms W1 and W2 typically have a cycle frequency in the range 100 kHz to 10 MHz but the frequency is not limited to this range.

A connection 122 leading from the source electrode 113 and a connection 123 leading from the drain electrode 112 of the synchronous rectifier 109 provide input leads to a zero crossing detector 125. The detector 125 has an output connection 127 which leads to form an input to the control logic unit 129.

A rectifier diode 121 is connected at one end to the junction 114 and is grounded at its other end. The diode 121 may be a deliberately added component and/or it may be a parasitic component.

The converter 100 operates in the following way. Electrical energy from the voltage source 101 is transferred from the voltage source 101 to the load resistor 117 by repetitive pulsing provided by the switching of the high side switch 103 caused by application of the drive waveform W1. Excess energy delivered from the voltage source 101 is stored and unloaded in the reactive components, namely the inductor 115 and the capacitor 119, whilst constant power is maintained in the load resistor 117, producing a stepped down voltage $V_{OUT}$ at the output terminal 116.

As noted earlier, the synchronous rectifier 109 is driven to conduct by the drive waveform W2 during portions of the cycle of the drive waveform W1 when the high side switch 103 is not conducting. The excess electrical energy stored in the inductor 115 and in the capacitor 119 in each positive part of the waveform W1 is thereby extracted as electrical current in each positive part of the waveform W2 via conduction of the synchronous rectifier 109.

The zero crossing detector 125 detects when in the waveform cycle the current in the inductor 115 reverses and provides via the connection 127 a signal to indicate this change of state to the control logic unit 129, which uses the signal to set the synchronisation of the waveforms W1 and W2 so that unwanted reverse current flow in the synchronous rectifier 109 is avoided. The zero crossing detector 125 is connected across the synchronous rectifier 109 to measure the voltage between the drain electrode 112 and the source electrode 113. When the synchronous rectifier 109 conducts, this measured voltage is proportional to the current flowing in the inductor 115 and the polarity of this voltage with respect to ground indicates the sense or polarity of the current flowing in the inductor 115. The zero crossing detector 125 comprises a comparator which compares the measured voltage with a reference voltage of zero volts. When the measured voltage is detected to cross zero volts, the detector 125 produces its output signal for delivery to the control logic unit 129.

Although the converter 100 shown in FIG. 1 produces good power conversion efficiency, there are problems affecting the operation which cause the efficiency to fall below a desirable level. These problems are as follows.

The synchronous rectifier 109 is employed to approach the behaviour of an ideal rectifying diode. This means that current can flow in one direction only. In an ideal rectifying diode, if forward current flows then there is a positive potential between the anode and the cathode of the diode. If there is no current in the diode then there is ideally no voltage across the diode. For the corresponding ideal behaviour of the synchronous rectifier 109, the current must flow only in one direction or not at all. If current flows in the reverse direction, then the synchronous rectifier 109 is not behaving as an ideal rectifying diode but simply as a resistor. The zero crossing detector 125 is employed in the manner described earlier to keep the synchronous rectifier 109 on only when current flows in the correct direction. The correct current flow is in the positive direction. This is the direction that the current would take if an ideal rectifying diode were used instead of the synchronous rectifier 109. The current is said to be flowing in the negative direction otherwise.

If the zero crossing detector 125 operates in an ideal manner, the synchronous rectifier 109 will be activated only whilst the current flowing in the inductor 115 is positive until the current decays to zero. However, to operate in such an ideal manner, the output state of the detector 125 would change exactly at the point in time of each waveform cycle when the voltage at the junction 114 is zero volts (hence the differential input voltage to the detector 125 from the connections 122 and 123 is zero since the reference voltage is also zero). However, if there is a negative offset error in the detector 125, its state will change whilst there is positive current flowing in the inductor 115, causing the synchronous rectifier 109 to be turned off prematurely. On the other hand, if there is a positive offset error in the detector 125, its state will change after positive current has finished flowing in the synchronous rectifier 109. This causes the synchronous rectifier 109 to be turned off too late thereby allowing the current of the inductor 115 to cross zero and undesirably increase in the negative or reverse direction.

There are two effects that can cause undesirable offset errors in the detector 109 to occur. The first effect is simply a random variation with time in properties of the semiconductor material from which the detector 125 is fabricated requiring the differential input to the detector 125 to be at a non-zero value for the detector 125 to change state correctly.

The second source of offset error is an apparent positive offset caused by delays in the detector 125 and in the control logic. As a result, the detector 125 reacts too late to the actual zero crossing point. In order to compensate for these delays the detector should react before that point.

In embodiments of the invention now to be described, the combined offset error in the zero crossing detector from the effects described above are repetitively monitored. Any adjustment required in consequence to a reference voltage employed in the detector to set a trip point of the detector is made to compensate for the error so that switching off of the synchronous rectifier 109 occurs at a desired point in each cycle of the waveform W2.

Figure 2:
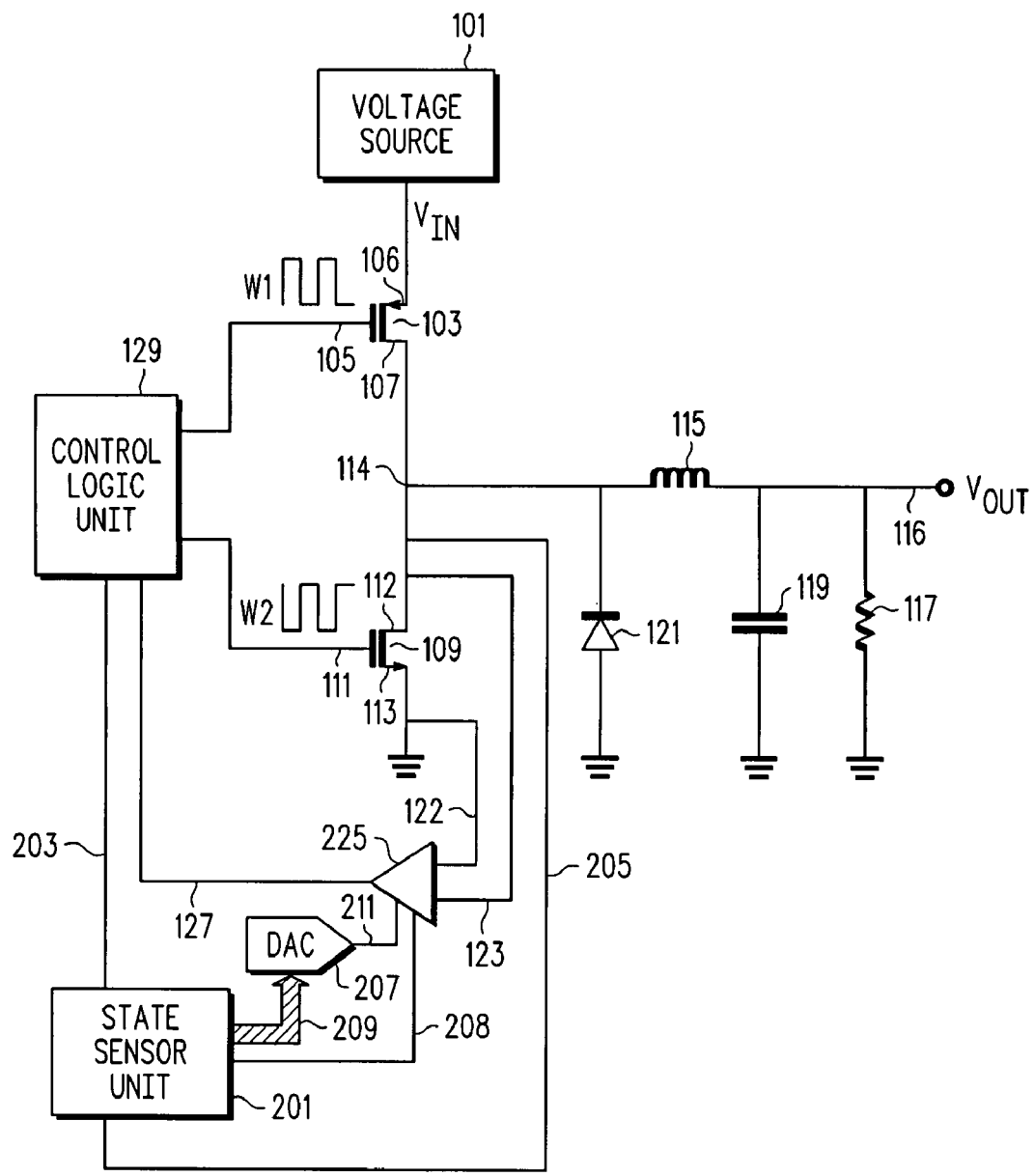
FIG. 2 is a circuit diagram, partly in block schematic form, of a DC-DC converter embodying the invention.

FIG. 2 is a circuit diagram, partly in block schematic form, of a DC-DC converter 200 in the form of a Buck converter embodying the invention. Parts shown in FIG. 2 having the same reference numerals as parts shown in FIG. 1 have the same function as such parts and will not be further described in connection with FIG. 2. As in the converter 100, the converter 200 includes a high side switch 103 and a synchronous rectifier 109. These are again shown in the particular form of p-mos (positive channel metal oxide semiconductor) and n-mos (negative channel metal oxide semiconductor) devices respectively with an applied positive voltage. Again, this is for illustration only. It will be apparent to those skilled in the art that the polarities could be reversed either with reversal of the polarity of the applied voltage or with use of a special gate system, e.g. using a capacitor.

In the converter 200, the zero crossing detector 125 of the converter 100 is replaced by a zero crossing detector 225 which again receives as an input a voltage measured across the synchronous rectifier 109 via the connections 122 and 123 and again provides an output to the control logic unit 129 via the connector 127. The converter 200 includes a state sensor unit 201 which receives a first input from the control logic unit 129 via a connection 203 and a second input provided by a connection 205 connected to the junction 114. The state sensor unit 201 provides an output signal to the detector 225 via a connection 208. The state sensor unit 201 also provides an output signal to a DAC (digital to analog converter) in the form of an I-DAC (current producing DAC) via a connection 209. The connection 209 is indicated in FIG. 2 as being in the form of a parallel signal bus. For a particular implementation, the bus may be 16 bits wide. However, in practice data may alternatively be sent serially from the state sensor unit 201 to the DAC 207. In fact if the circuit is fabricated in the form of an integrated circuit construction partitioned on two pieces of silicon (one optimized for power and the other for digital logic), a serial bus may be the preferred form of the connection 209.

Operation of the parts of the converter 200 which appear in FIG. 2 but not FIG. 1 is as follows. A signal applied via the connection 205 to the state sensor unit 201 provides information about the polarity or sense of current at the junction 114. A signal from the control logic unit 129 indicates timing of the cycles of the waveform W2. The state sensor unit 201 detects the polarity or sense of the current flowing at the junction 114 at a point in time immediately following the synchronous rectifier 109 being switched off by the waveform W2. The state sensor unit 201 takes one logic state ('1') if the junction 114 is positive and the opposite state ('0') if the junction 114 is negative when the synchronous rectifier 109 is turned off. In practice, a very fast polarity detector may be used to compare the potential at the junction 114 with a small positive potential (e.g. about 500 mV) and to generate the logic state signal accordingly. The state sensor unit 201 further reacts to this logic state signal to determine if adjustment of a reference voltage employed in the detector 225 is needed to adjust a trip point of the detector 225 and, if so, in what sense and provides an output signal accordingly to the DAC 207. Operation of the state sensor unit 201 is illustrated later with reference to FIGS. 4 and 5.

The DAC 207 converts the output signal produced by the state sensor unit 201 from a digital signal to an analog signal. The analog signal is in the form of a small correction current. The current is delivered to or withdrawn from the detector 225 causing corresponding adjustment of the reference voltage employed by the detector 225 for comparing the voltage across the synchronous rectifier 209.

In this way, the reference voltage providing a trip point in the detector 225 can be shifted about a trip point for an ideal synchronous rectifier 109 (where the reference voltage is zero volts) thereby compensating for both random process offset errors and the apparent offset errors referred to earlier.

Parts of the converter 200 which appear in FIG. 2 but not FIG. 1 are shown in some more detail in FIG. 3 and are described further as follows. The detector 225 includes a switch 230 which, under control of signals applied via the connection 208 from the state sensor unit 201, connects a terminal 234 either to a terminal 235 or to a terminal 236.

Current always flows into the DAC 207 to ground. When the terminal 234 is connected to the terminal 235 a small compensating current is pulled from a suitable point in a differential gain stage 232 of the detector 225 to ground. This will make the differential gain stage 232 of the detector 225 trip when an input $V_{LX}$ is more negative than a reference input $V_{REF}$. $V_{LX}$ is the measured voltage across the synchronous rectifier 109 referred to earlier.

When the switch 230 is operated to connect the terminal 234 to the terminal 236, current is reversed by a current reverser 231 and flows into the differential gain stage 232 from a positive voltage supply (not shown). In practice, the current reverser 231 may include a further switch operated to close in tandem with the switch 230 when the terminal 234 is connected to the terminal 235. The further switch may be connected to a p-mos mirror (two p-mos transistors whose gates are connected back to back) which reverses the DAC 207 current when the further switch is closed. In this condition, the detector 225 trips when the input voltage $V_{LX}$ is more positive than $V_{REF}$.

The output signal produced by the differential gain stage 232 is applied to an amplifier 233 (which in practice may comprise a plurality of further gain stages) in which it is further amplified to provide a detector output. This is the signal referred to earlier to indicate that the detector 225 has detected a change of sense of the current at the junction 114. This signal is applied via the connection 127 to the control logic unit 129.

The state sensor unit 201 and the DAC 207 may adjust the reference voltage or trip point employed by the detector 225 once per cycle of the waveform W2. Thus the adjustment to provide automatic 'trimming' or 'zeroing' of the detector 225 in this way is effectively continuous and is in real time. The adjustment current employed by the DAC 207 in each iteration of the compensation may be a single size current so that adjustment to reach a correct trip point may take place in incremental steps over several waveform cycles. Alternatively, the state sensor 201 may identify a size of positive or negative current needed to adjust immediately to the correct trip point and that current may be injected or withdrawn in one step in a given cycle.

Figure 3:
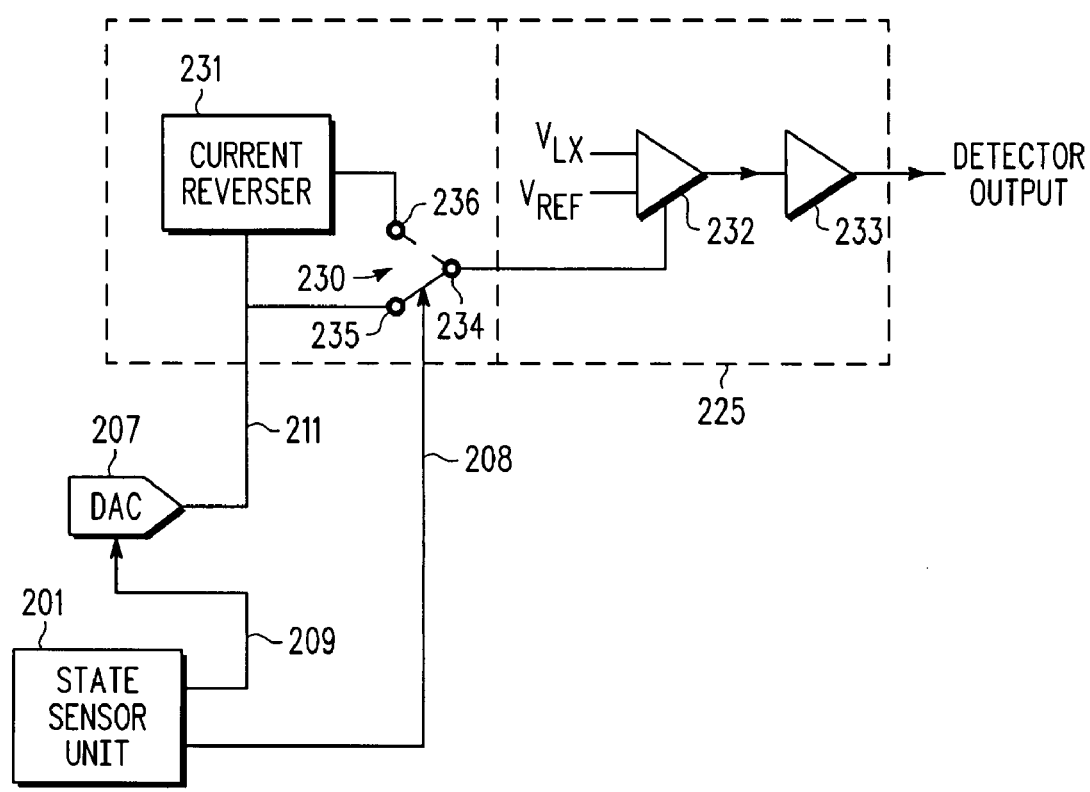
FIG. 3 is a circuit diagram in block schematic form of an offset error monitoring and correcting arrangement for a zero crossing detector employed in the circuit shown in FIG. 2.
Figure 4:
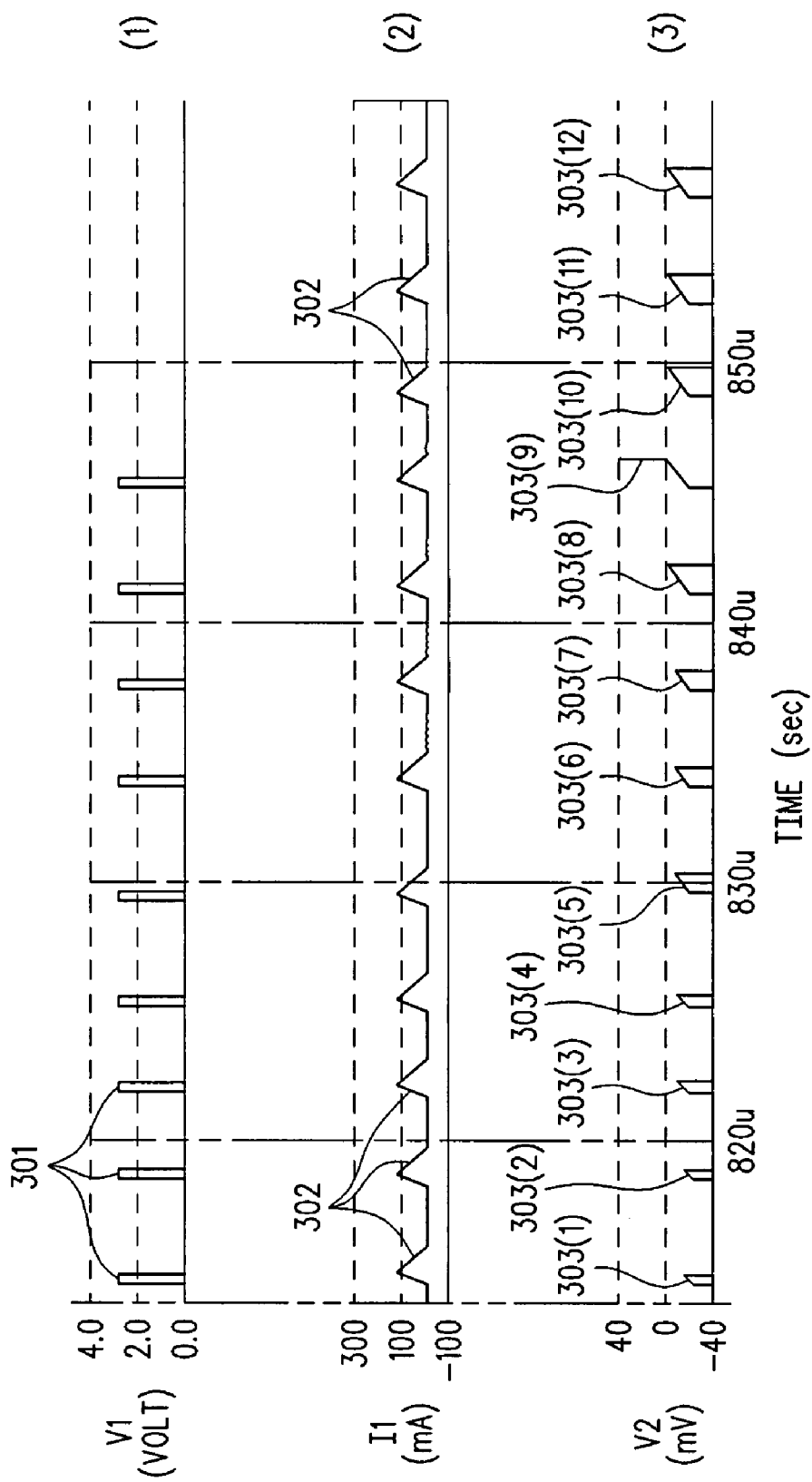
FIG. 4 is a set of three related graphs showing waveforms illustrating operation of the embodiment of the invention shown in FIGS. 2 and 3.
Figure 5:
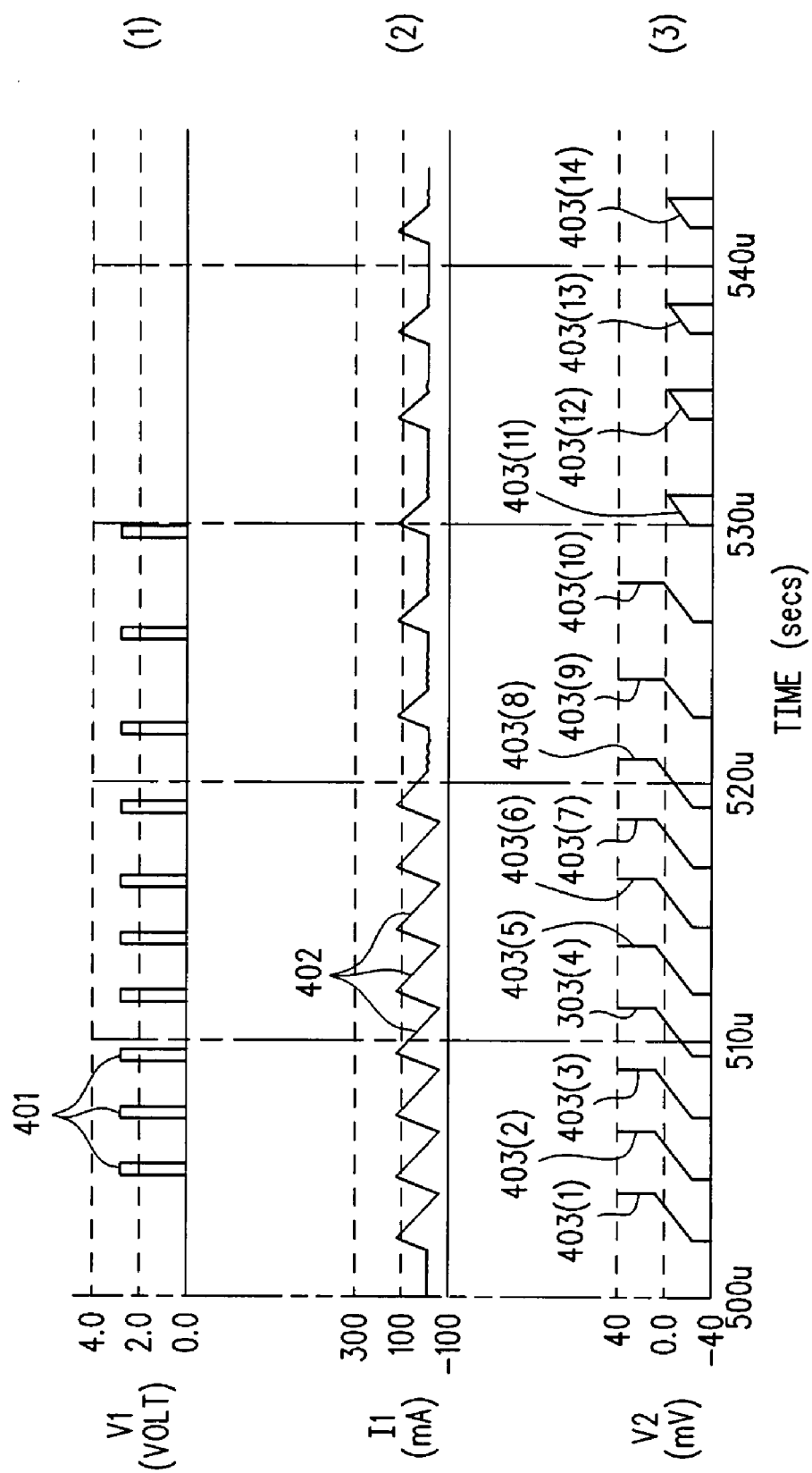
FIG. 5 is a set of three further related graphs showing waveforms further illustrating operation of the embodiment of the invention shown in FIGS. 2 and 3.

FIGS. 4 and 5 show waveforms obtained by computer simulation to illustrate operation of the embodiment of the invention described with reference to FIG. 2 with the converter circuit 200 operating in a discontinuous conduction mode. These illustrate the case where a correction current is applied in incremental steps until a change in current sense is detected by the state sensor unit 201. In each of FIG. 4 and FIG. 5, three related waveforms (1), (2) and (3) are shown. These represent respectively: (1) clock signal pulses (V1) 301 (FIG. 4) and 401 (FIG. 5) (measured in volts) when each trim cycle of the detector 225 is to be initiated; (2) current (I1) flowing in the inductor 115 (measured in mA); this is in the form of triangles 302 (FIG. 4) and 402 (FIG. 4); and (3) potential (V2) (measured in mV relative to zero volts) appearing at the junction 114 immediately following each of the pulses 301; this is in the form of curves 303 (FIG. 3) and 403 (FIG. 4). The curves 303 and 403 illustrate relevant parts of the input $V_{LX}$ to the detector 225 referred to earlier. Each of the pulses 301 and 401 follows turn off of the synchronous rectifier 109 if an incremental trim of the detector 225 is necessary. These occur at a time slightly after the end of the curves 303 or 403. The state sensor unit 201 reacts to the polarity of the junction 114 after the synchronous rectifier 109 releases. Hence a pulse 301 or 401 may or may not be issued as a result of the profile of the curves 303 or 403.

Referring now to FIG. 4, the waveforms shown illustrate zero trimming of the detector 225 when it has a negative offset error. During each pulse 301 shown in FIG. 4(1), the inductor 115 current shown in FIG. 4(2) in the triangles 302 rises from zero to an apex at the end of the pulse 301 then, immediately following the end of the pulse 301, falls back to zero. Whilst each pulse 301 is applied, the potential at the junction 114 varies in the form of a pulse (not shown) which follows the shape of the pulse 301. At the end of each pulse 301, the potential at the junction 114 follows the form of the curves 303 shown in FIG. 3(3). Initially, as seen for the curve 303(1)

shown furthest left in FIG. 3(3), the curve 303 begins with a vertical portion then has a top portion which ramps upward toward zero volts and finally falls to a more negative value in a further vertical portion. The fall to a more negative value is because there is still positive current in the inductor 115 and the current seeks a path through the diode 121 which has a greater voltage drop for the same amount of current than the synchronous rectifier 109.

Initially, the top ramped portion of the curve 303(1) begins at a voltage about 20 mV below zero and the top portion is narrow and reaches a voltage still significantly below zero before falling to a greater negative value in the further vertical portion. This may be considered as representing a negative offset error which has not yet been compensated for but for which the monitoring and compensation now starts. As time progresses (reading from left to right in FIG. 4(3)) the ramped top portion of each curve 303(2), 303(3) etc. becomes wider and approaches nearer and nearer to zero by application of a correction current pulse to the detector 225 at each cycle. Eventually, in the eighth curve 303(8), the top ramped portion of the curve 303 reaches zero and then in the ninth curve 303(9) goes positive in a positive vertical portion. This effect is detected by the state sensor unit 201 (FIG. 2) which causes an adjustment current to be applied to the detector 225 in the manner described earlier to restore a very slight negative offset to produce the form of the tenth curve 303(10) again having the ramped top portion which almost reaches zero and a vertical negative portion. This form is maintained in the final two curves 303(11) and 303(12).

Referring to FIG. 5, the form of the pulses 401 is similar to the corresponding pulses 301 and the shape of the current triangles 402 is similar to the corresponding current triangles 302 respectively shown in FIG. 4. However, it is to be noted that in this case that the current in the triangles 402 goes negative (below zero) in triangles 402 on the left side of FIG. 5 (2) and also the spacing between pulses 401 and between current triangles 402 increases as time progresses. This indicates that for, the same loading, less energy is lost (due to the offset error) and fewer switching cycles are needed to maintain power in the load resistor 117.

At the end of each pulse 401, the potential at the junction 114 follows the form of the curves 403 shown in FIG. 5(3). Initially, as seen in the furthest left curve 403(1) in FIG. 5(3), the curve 403 has a negative vertical portion, a portion which ramps upward toward zero volts and crosses zero volts and a positive vertical portion. This may be considered as representing a positive offset error which has not yet been compensated for but for which the monitoring and compensation now starts. As time progresses with the monitoring and adjustment applied, the ramped portions of the curves 403(2), 403(3) etc. become smaller and end closer to zero. Eventually, in the tenth curve 403(10) when the end of the ramped portion crosses zero volts, this effect is detected by the state sensor unit 201 (FIG. 2) finishing the adjustment process leaving a very slight negative offset producing the eleventh curve 403(11) in which the curve goes negative again in a vertical negative portion at the end of the ramp portion. This form is maintained in the final three curves 403(12), 403(13) and 403(14).

By monitoring the state of the junction 114 once per waveform cycle and, if required, adjusting the detector 225 accordingly in the manner described it is not necessary to look for sub mV accuracy to set a comparator used in the detector 225. By sensing the potential of the junction 114 at the point in time when the synchronous rectifier 109 is switched off, a signal may be obtained which easily allows indication of the offset error sign. Furthermore, since the detector 225 can be adjusted once per waveform cycle in real time it is not necessary to ensure that intrinsic offset errors in the detector 109 are very low. Thus, drifts in properties of the semiconductor material of the detector 109 caused for example by changes in temperature and ageing are automatically compensated for.

The converter 200 in at least some of its parts, particularly the unit 129, the switch 103, synchronous rectifier 109, detector 225 and state sensor 201, may be fabricated in the form of a semiconductor, e.g. silicon, integrated circuit using one or more semiconductor pieces or chips.

Using the improved form of synchronous rectifier 109 illustrated in the converter 200 shown in FIG. 2, improved converter efficiency, which is a key operational parameter, is beneficially obtained.

The improved form of circuit described with reference to FIG. 2 to control operation of the synchronous rectifier 109 is not limited in application to DC-DC converters of the particular form of the converter 100 which is known in the art as a Buck converter in which an input voltage is stepped down by the converter to produce a smaller output voltage. The improved form of circuit described with reference to FIG. 2 to control operation of the synchronous rectifier 109 may for example be used in any known form of converter using a synchronous rectifier. As in the converter 100, synchronous rectifiers are used in such circuits to replace rectifying diodes and are driven by the same circuitry employed to drive an electronic switch in the circuit. The signal from such circuitry turns the synchronous rectifier on in the same part of the cycle that the rectifier would normally conduct. For example, such a circuit may be used in Boost converter or Buck-Boost converter or in a Sepic converter. A Boost converter is a known DC-DC converter which operates to step up voltage from a given input voltage to a higher output voltage. A Buck-Boost converter is a known converter which is a combination of a Buck converter and a Boost converter where the input voltage can be in a given range, e.g. 2.5V to 6V, and the output is a voltage within the range, e.g. 3.3V. The voltage may be stepped up or down depending on converter duty cycle. A Sepic converter is a particular form of Buck-Boost converter. Further converter types which may employ one or more synchronous rectifiers modified in accordance with the embodiment of the invention described with reference to FIG. 2 include charge pump converters, isolating converters, flyback converters and forward converters. All of these converter types are described in the published literature, e.g. in Electus Distribution Reference Data Sheet DCDCCONV.PDF(1) to be found at wwwl.electusdistribution.com.au.

If a DC-DC converter operates in both a continuous mode and a discontinuous mode (as is often the case with small portable device applications) then an embodiment of the invention may beneficially be employed in such a converter. For example, in the BUCK converter, the inductor current can be depleted. If negative, current is allowed to flow in the inductor then energy is being wasted at some level, so use of the invention embodiment allows saving of such energy.

A converter including an improved synchronous rectifier circuit in accordance with an embodiment of the invention, as illustrated by the circuit employed in the converter 200, may be employed to provide improvement in voltage transformation efficiency in a range of known applications wherein the voltage is changed in one of the ways described earlier. Of particular current interest is application in mobile or portable electronic devices. Such devices include mobile devices for mobile communications such as portable radios, mobile telephones, PDAs (personal digital assistants), data communication handsets and the like. The input voltage in such devices may be obtained for example from a battery, a plurality of batteries connected in series, a transformed mains source or a vehicle power supply. For example, the input voltage may be from 3 volts to 6 volts. The output voltage may be from 1 volt to 2.5 volts, e.g. 1.6 volts, to operate one or more processors of the devices.

The invention claimed is:

1. An electronic switch circuit comprising:
an electronic switch having a first terminal, a second terminal and a third terminal;
control means for applying to the first terminal a cyclic drive waveform which causes the electronic switch to conduct between the second and third terminals during a selected portion of each cycle of the waveform, operably coupled to the control means to control synchronisation of the cyclic drive waveform a detector operable to detect a change of direction of current flow at the second terminal of the electronic switch and means for repetitively monitoring for offset error of the detector and, where required, compensating for the offset error, wherein the detector comprises:
a voltage comparator operable to compare a measured voltage between the second and third terminals of the electronic switch with a reference voltage and to determine when the measured voltage changes sign with respect to the reference voltage and wherein the means for monitoring and compensating for offset error of the detector includes:
(i) a state sensor operable to sense a polarity of the second terminal at a selected point in the cycle of the cyclic drive waveform when conduction of the electronic switch is turned off by the waveform and to produce a corresponding output signal; and
(ii) means for adding to or withdrawing from the detector in response to the output signal produced by the state sensor a compensating current which adjusts a reference voltage of the detector.

2. A circuit according to claim 1 wherein the detector includes a differential gain stage and a gain stage and the means for adding or withdrawing current is operable to add current to or withdraw current from the differential gain stage.

3. A circuit according to claim 1, wherein the means for adding or subtracting current is operable to adjust the reference voltage of the detector in incremental steps in a given direction until the state sensor detects a change in polarity of the second terminal at a selected point in a cycle of the cyclic drive waveform.

4. A circuit according to claim 1, which includes, operably coupled to the state sensor, a current producing DAC (digital to analog converter) which produces a current flow for use in producing the adjustment current and, operably coupled to and controlled by the state sensor, a switching device to control a direction of the adjustment current flow.

5. A circuit according to claim 1, s wherein the electronic switch comprises a synchronous rectifier.

6. A circuit according to claim 1, wherein the electronic switch comprises a voltage controlled semiconductor device.

7. A circuit according to claim 6 wherein the voltage controlled semiconductor device comprises a metal oxide semiconductor power transistor.

8. A DC to DC power converter including at least one synchronous rectifier circuit which comprises an electronic switch circuit according to claim 1.

9. A DC to DC converter according to claim 8 which is a converter selected from the group of converters consisting of: Buck converters, Boost converters, Buck-Boost converters, Sepic converters, charge pump converters, isolating converters, flyback converters and forward converters.

10. A converter according to claim 8 wherein the electronic switch comprises:
a synchronous rectifier and including a voltage source, a further electronic switch having a first terminal connected to the control means, a second terminal connected to the voltage source and a third terminal connected to a terminal of the synchronous rectifier;
the control means being operable to apply to the first terminal of the further electronic switch a further cyclic drive waveform to cause the further electronic switch to conduct between its second and third terminals during selected portions of each cycle of the further drive waveform, wherein the cyclic drive waveforms applied respectively to the synchronous rectifier and the further electronic switch are mutually synchronised so that only one of the synchronous rectifier device and the further electronic switch conducts at a time.

11. A converter according to claim 10 which is a Buck converter wherein the second terminal of the synchronous rectifier and the third terminal of the further electronic switch are connected through an inductor to a load impedance, and a capacitor connected to a node between the inductor and the load impedance, the converter having an output terminal connected to the load impedance.

12. A converter according to claims 10 including a further rectifier connected in parallel with the synchronous rectifier.

13. A converter according to claim 10, wherein the further electronic switch comprises a voltage controlled semiconductor device.

14. A method of operation of an electronic switch circuit including an electronic switch having a first terminal, a second terminal and a third terminal, the method comprising:
applying from control means to the first terminal a cyclic drive waveform which causes the electronic switch to conduct between the second and third terminals during a selected portion of each cycle of the waveform;
detecting by a detector a change of direction of current flow at the second terminal of the electronic switch;
providing an output signal from the detector to the control means to control synchronisation of the cyclic drive waveform and repetitively monitoring for offset error of the detector and, where required, compensating for the offset error;
comparing by a voltage comparator of the detector a measured voltage between the second and third terminals of the electronic switch with a reference voltage and determining when the measured voltage changes sign with respect to the reference voltage;
sensing a polarity of the second terminal at a selected point in the cycle of the cyclic drive waveform when conduction of the electronic switch is turned off by the waveform and to produce a corresponding output signal; and
adding or withdrawing a compensating current from the detector in response to the output signal produced by the state sensor, the compensating current adjusting a reference voltage of the detector.

15. A circuit according to claim 1, wherein the detector includes a differential gain stage and a gain stage and the means for adding or withdrawing current is operable to add current to or withdraw current from the differential gain stage.

16. A converter according to claim 9, wherein the electronic switch comprises:
a synchronous rectifier and including a voltage source, a further electronic switch having a first terminal connected to the control means, a second terminal connected to the voltage source and a third terminal connected to a terminal of the synchronous rectifier;

the control means being operable to apply to the first terminal of the further electronic switch a further cyclic drive waveform to cause the further electronic switch to conduct between its second and third terminals during selected portions of each cycle of the further drive waveform, wherein the cyclic drive waveforms applied respectively to the synchronous rectifier and the further electronic switch are mutually synchronised so that only one of the synchronous rectifier device and the further electronic switch conducts at a time.

17. A converter according to claims 11, including a further rectifier connected in parallel with the synchronous rectifier.

* * * * *